US008655909B2

(12) United States Patent
Kitaichi et al.

(10) Patent No.: US 8,655,909 B2
(45) Date of Patent: Feb. 18, 2014

(54) COMMUNICATION APPARATUS AND ADDRESS LEARNING METHOD

(75) Inventors: Ryuichi Kitaichi, Tokyo (JP); Kazuyuki Kashima, Tokyo (JP); Kenji Kitayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/580,726

(22) PCT Filed: Feb. 25, 2010

(86) PCT No.: PCT/JP2010/052978
§ 371 (c)(1),
(2), (4) Date: Aug. 23, 2012

(87) PCT Pub. No.: WO2011/104847
PCT Pub. Date: Sep. 1, 2011

(65) Prior Publication Data
US 2012/0317138 A1  Dec. 13, 2012

(51) Int. Cl.
*G06F 17/30* (2006.01)
(52) U.S. Cl.
USPC .......................................... 707/769; 707/704
(58) Field of Classification Search
USPC ....................................................... 707/769
See application file for complete search history.

(56) References Cited

U.S. PATENT DOCUMENTS

| 4,825,206 A * | 4/1989 | Brice et al. ............... 370/216 |
| 7,315,898 B2 * | 1/2008 | Kohno ......................... 709/230 |
| 2003/0065800 A1 * | 4/2003 | Wyschogrod et al. ....... 709/230 |
| 2003/0072316 A1 * | 4/2003 | Niu et al. ..................... 370/412 |
| 2003/0110344 A1 * | 6/2003 | Szczepanek et al. ........ 711/100 |
| 2003/0120802 A1 * | 6/2003 | Kohno ........................ 709/237 |
| 2004/0109408 A1 * | 6/2004 | Mesh et al. .................. 370/222 |

(Continued)

FOREIGN PATENT DOCUMENTS

| JP | 4 360336 | 12/1992 |
| JP | 2002-305537 | 10/2002 |
| JP | 2006 270169 | 10/2006 |
| JP | 2008 148176 | 6/2008 |
| JP | 2009-10720 | 1/2009 |
| WO | 2007 086539 | 8/2007 |

OTHER PUBLICATIONS

IEEE Standard for Local and metropolitan area networks, "Media Access Control (MAC) Bridges," IEEE Std 802.1D, pp. 37 to 48 (2004).

(Continued)

*Primary Examiner* — Shahid Alam
*Assistant Examiner* — Nargis Sultana
(74) *Attorney, Agent, or Firm* — Oblon, Spivak, McClelland, Maier & Neustadt, L.L.P.

(57) ABSTRACT

A communication apparatus operates as a node of a network. The communication apparatus includes a port-state managing unit that updates, every time failure occurrence in the network is detected, state information indicating a state of the network, a database updating unit that updates, based on a transmission source address and a reception port of a received frame and the state information managed by the port-state managing unit, a database that determines an output port when a frame in which the transmission source address is a destination address is received, and an output-destination determining unit that determines an output port of the received frame by searching through the database using, as search keys, the destination address of the received frame and the state information managed by the port-state managing unit.

19 Claims, 10 Drawing Sheets

(56) References Cited

U.S. PATENT DOCUMENTS

| | | | |
|---|---|---|---|
| 2006/0215544 A1* | 9/2006 | Asa et al. | 370/216 |
| 2007/0127367 A1* | 6/2007 | Ogasahara et al. | 370/226 |
| 2008/0270764 A1* | 10/2008 | McMillen et al. | 712/220 |
| 2009/0103554 A1* | 4/2009 | Akahane et al. | 370/406 |
| 2009/0185566 A1* | 7/2009 | Ogasahara et al. | 370/395.3 |
| 2009/0232148 A1* | 9/2009 | Endo et al. | 370/401 |
| 2009/0268746 A1* | 10/2009 | Ogasahara et al. | 370/406 |
| 2010/0110881 A1* | 5/2010 | Ryoo et al. | 370/225 |
| 2010/0226377 A1* | 9/2010 | Ogasahara et al. | 370/400 |
| 2011/0122762 A1* | 5/2011 | Wu | 370/218 |
| 2012/0127854 A1* | 5/2012 | Khetan et al. | 370/218 |
| 2012/0224471 A1* | 9/2012 | Vinod et al. | 370/222 |
| 2013/0003530 A1* | 1/2013 | Davari | 370/225 |

OTHER PUBLICATIONS

International Search Report Issued Mar. 23, 2010 in PCT/JP10/52978 Filed Feb. 25, 2010.

Office Action issued Apr. 9, 2013, in Japanese Patent Application No. 2012-501579 (with English-language translation).

Tomoyuki Oku, et al. "A Protocol for Dealing with Failures on Ring Topology", The Institute of Electronics, Information and Communication Engineers, IEICE Technical Report, vol. 106, No. 420, Dec. 7, 2006, pp. 19-24 (with English Abstract).

* cited by examiner

| ENTRY NUMBER | SEARCH KEY | | OUTPUT INFORMATION |
| --- | --- | --- | --- |
| | DESTINATION MAC ADDRESS | FAILURE STATE NUMBER | OUTPUT PORT |
| 1 | NODE 10 | 0 | 301 |
| 2 | NODE 20 | 0 | 301 |
| 3 | NODE 30 | 0 | 303 |
| 4 | NODE 50 | 0 | 302 |
| 5 | NODE 60 | 0 | 302 |

FIG.9

| ENTRY NUMBER | DESTINATION MAC ADDRESS | FAILURE STATE NUMBER | OUTPUT PORT |
|---|---|---|---|
| | SEARCH KEY | | OUTPUT INFORMATION |
| 1 | NODE 30 | 1 | 303 |
| 2 | NODE 20 | 1 | 301 |
| 3 | NODE 30 | 0 | 303 |
| 4 | NODE 50 | 0 | 302 |
| 5 | NODE 60 | 0 | 302 |

FIG.10

| ENTRY NUMBER | DESTINATION MAC ADDRESS | FAILURE STATE NUMBER | OUTPUT PORT |
|---|---|---|---|
| | SEARCH KEY | | OUTPUT INFORMATION |
| 1 | NODE 30 | 1 | 301 |
| 2 | NODE 20 | 1 | 301 |
| 3 | NODE 10 | 1 | 303 |
| 4 | NODE 60 | 1 | 301 |
| 5 | NODE 50 | 1 | 301 |

| ENTRY NUMBER | DESTINATION MAC ADDRESS | FAILURE STATE NUMBER | OUTPUT PORT |
|---|---|---|---|
| | SEARCH KEY | | OUTPUT INFORMATION |
| 1 | NODE 10 | 0 | 301 |
| 2 | NODE 20 | 1 | 301 |
| 3 | NODE 30 | 1 | 303 |
| 4 | NODE 50 | 0 | 302 |
| 5 | NODE 60 | 1 | 301 |

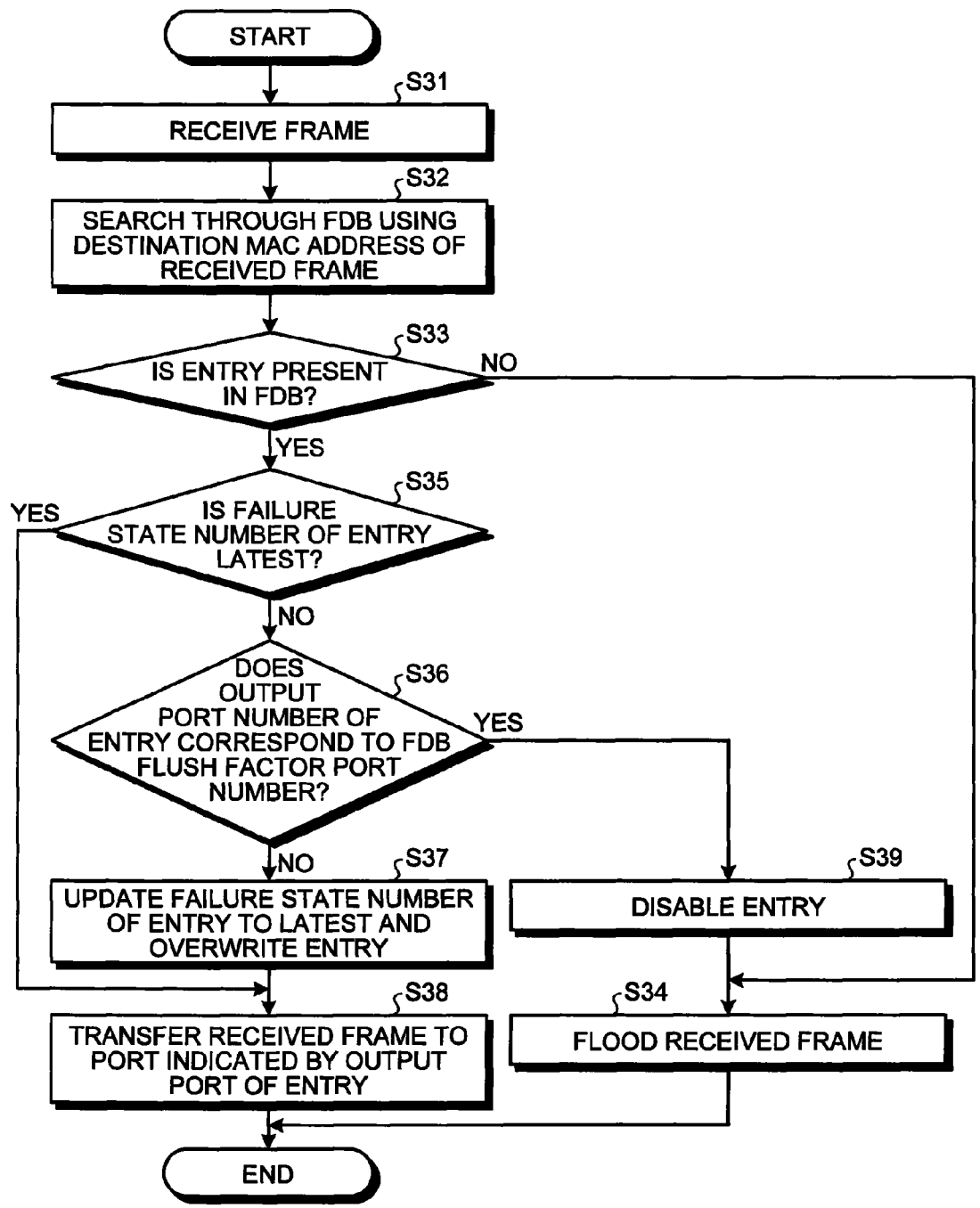

COMMUNICATION APPARATUS AND ADDRESS LEARNING METHOD

FIELD

The present invention relates to a communication apparatus that relays a received frame in a network and an address learning method.

BACKGROUND

A bridge apparatus or a switch apparatus (hereinafter referred to as L2 switch), which is a relay apparatus for an Ethernet (registered trademark) frame (hereinafter simply described as "frame"), includes a database called FDB (Filtering Database) for accumulating an entry including a transmission source MAC address of a received frame, a port in which the frame is received, and other information. In the FDB, an entry is added every time a frame is received anew. This operation is called MAC address learning (or address learning).

The FDB is used when a received frame is relayed. Specifically, the L2 switch that receives a frame searches through the FDB using a destination MAC address of the received frame as a search key. If the destination MAC address is a learned MAC address, a port (an output port) corresponding to the MAC address used as the search key is obtained. If the received frame is transferred to the port, because another L2 switch of a transfer destination performs the same operation, the received frame finally reaches a target Ethernet (registered trademark) node (hereinafter simply described as "node"). On the other hand, concerning a received frame having a destination MAC address without an entry in the FDB, information concerning an output port is not obtained even if the L2 switch that receives the frame searches through the FDB (it is unknown to which port the frame should be transferred). Therefore, the L2 switch broadcasts the received frame to all ports other than a port in which the frame is received. This operation is called flooding. Such a frame relay operation is described in Non Patent Literature 1.

CITATION LIST

Non Patent Literature

Non Patent Literature 1: IEEE Standard for Local and Metropolitan Area Networks: Media Access Control (MAC) Bridges, IEEE Std 802.1D-2004, p. 41 to 48

SUMMARY

Technical Problem

In a network including a plurality of L2 switches, when a failure occurs somewhere in the network, a relay path for a frame changes. Therefore, it is necessary to disable all entries of FDBs included in the L2 switches, perform address learning again in the changed relay path, and reconstruct FDBs. The disabling of all the entries of the FDBs is also called FDB flush.

On the other hand, the size of a network is increased and the number of entries of an FDB is also increased according to an increase in the number of connected nodes. As a result, time consumed for the FDB flush is regarded as a problem. Specifically, the address learning cannot be performed until the disabling of all the entries of the FDBs ends. Therefore, before the address learning is completed, the L2 switches flood all received frames. In other words, there is a problem in that traffic of the network increases according to the FDB flush and is likely to cause a trouble in operation.

The present invention has been devised in view of the above and it is an object of the present invention to obtain a communication apparatus that resumes address learning for reconstructing an FDB after a failure is detected in a network.

Solution to Problem

In order to solve the above problem and in order to attain the above object, in a communication apparatus that operates as a node of a network, the communication apparatus of the present invention, includes: a state managing unit configured to update, every time failure occurrence in the network is detected, state information indicating a state of the network; a database updating unit configured to update, based on a transmission source address and a reception port of a received frame and the state information managed by the state managing unit, a database for determining an output port when a frame in which the transmission source address is a destination address is received; and an output-destination determining unit configured to determine an output port of the received frame by searching through the database using, as search keys, the destination address of the received frame and the state information managed by the state managing unit.

Advantageous Effects of Invention

The communication apparatus according to the present invention has an effect that it is possible to reduce time required from occurrence of a failure in the network until reconstruction of the FDB is started.

BRIEF DESCRIPTION OF DRAWINGS

FIG. 9 is a diagram of an example of an FDB learning operation after failure occurrence.

FIG. 10 is a diagram of an example of an FDB learning operation after failure occurrence.

FIG. 14 is a flowchart for explaining a frame transfer procedure by the ring node according to the second embodiment.

DESCRIPTION OF EMBODIMENTS

A communication apparatus and an address learning method of embodiment according to the present invention are explained in detail below based on the drawings. The present invention is not limited by the embodiments.

First Embodiment

Figure 1:
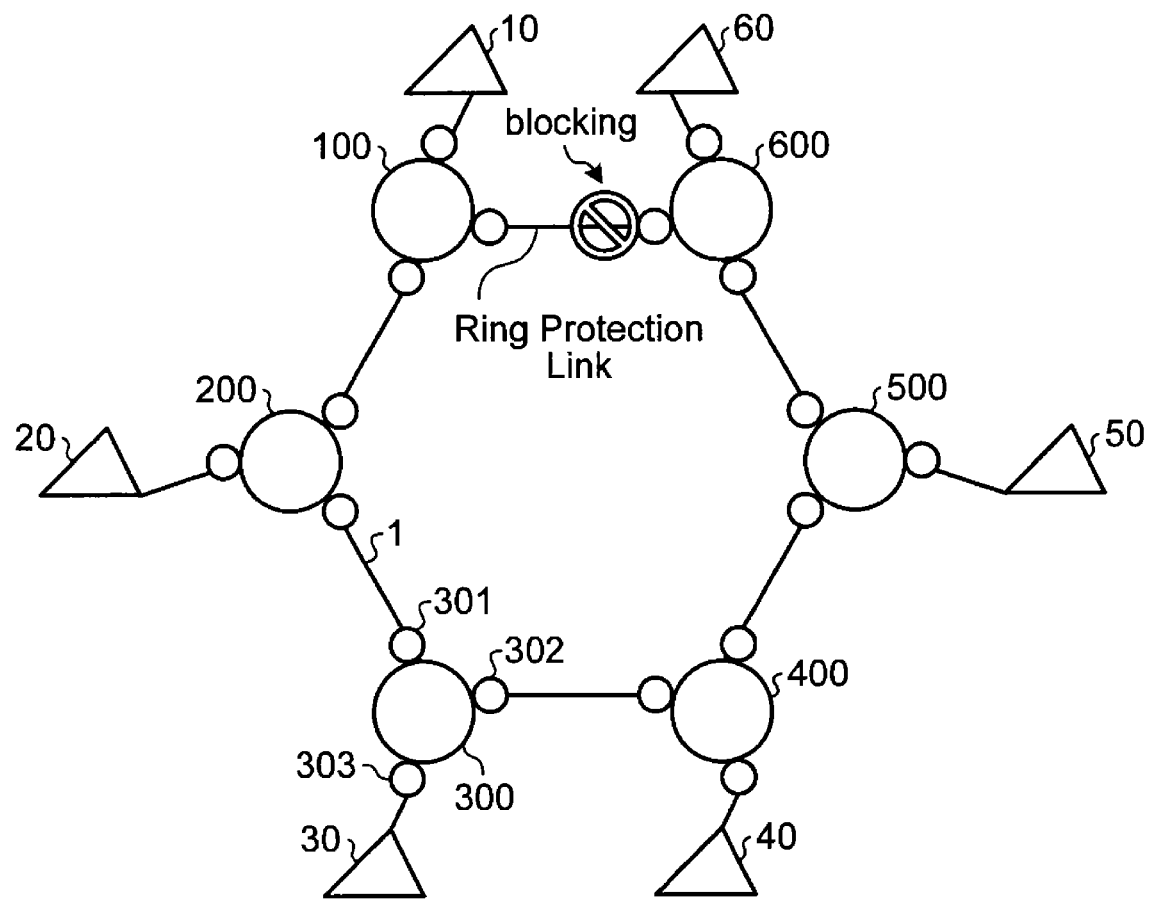
FIG. 1 is a diagram of a configuration example of a communication system according to a first embodiment.

FIG. 1 is a diagram of a configuration example of a communication system including a ring network configured by ring node apparatuses (hereinafter described as "ring nodes") equivalent to a communication apparatus according to a first embodiment. The communication system includes a ring network 1 configured by a plurality of ring nodes (ring nodes 100, 200, 300, 400, 500, and 600) according to this embodiment and a plurality of nodes (nodes 10, 20, 30, 40, 50, and 60) connected to the ring network 1. In FIG. 1, input and output ports of the ring nodes are also shown. Input and output ports of the ring node 300 are represented as ports 301 to 303. The port 301 houses a link connected to the ring node 200. The port 302 houses a link connected to the ring node 400. The port 303 houses a link to which the node 30 is connected.

The ring network 1 is configured according to a method prescribed in a literature "ITU-T Recommendation G.8032/Y.1344, Ethernet Ring Protection Switching" (hereinafter referred to as "ERP"). The ring nodes configuring the ring network 1 are L2 switches implemented with a function conforming to the ERP. In the ERP, a network failure switching method is also prescribed. According to this prescription, when failure switching of a relay path of a network occurs, FDB flush is necessary.

In the ring network 1, a link that connects the ring nodes 100 and 600 is set as a Ring Protection Link. The ring node 600 is set as a node called RPL (Ring Protection Link) Owner. In the ring node 600, a port that houses a Ring Protection Link is blocked to prevent a frame from looping on the ring network 1.

Figure 2:
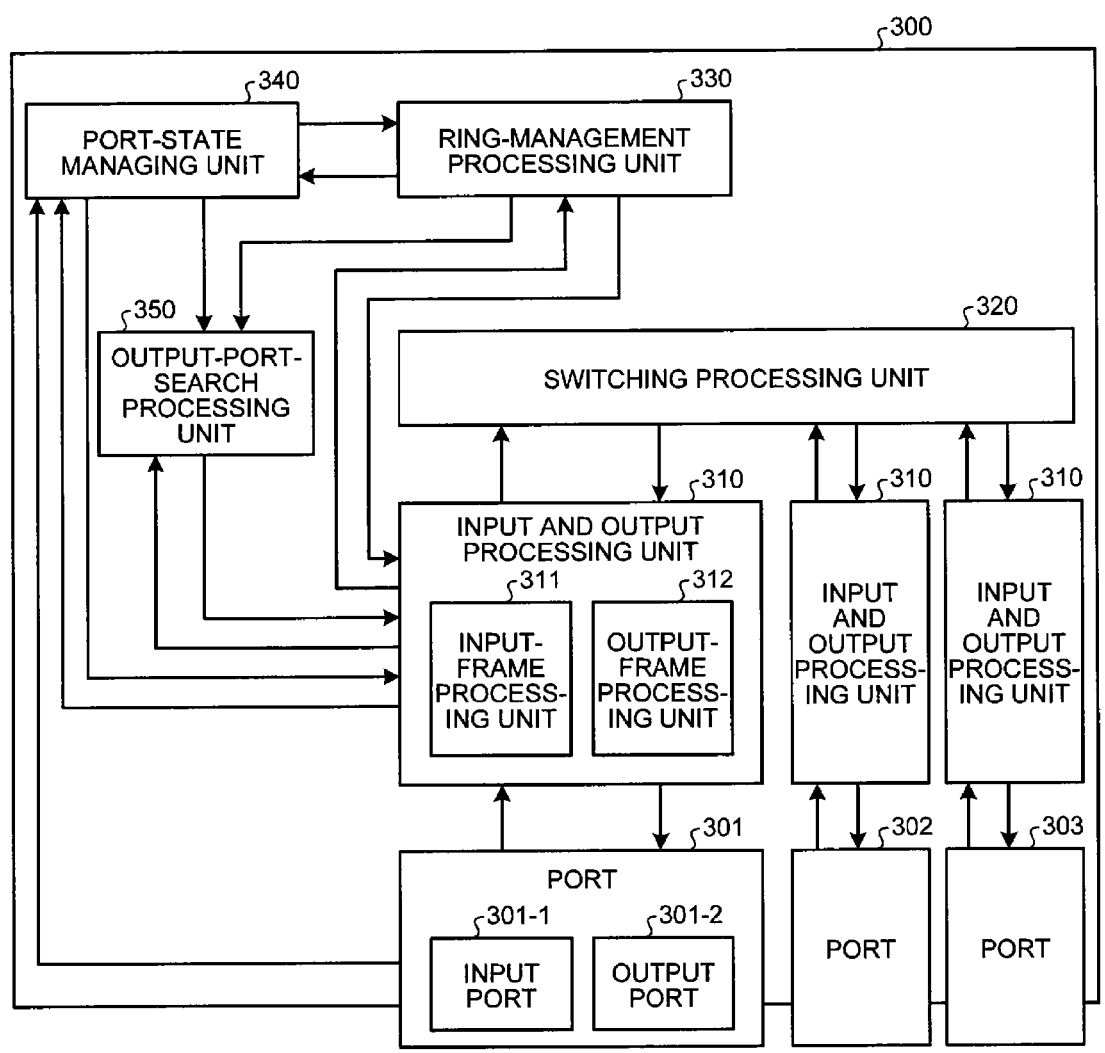
FIG. 2 is a diagram of a configuration example of a ring node.

FIG. 2 is a diagram of a configuration example of a ring node included in the ring network 1. In FIG. 2, a configuration example of the ring node 300 is shown as an example. However, the configurations of the ring nodes included in the ring network 1 are the same. As explained above, in the ring node 600 set as the RPL Owner, the port that houses the Ring Protection Link is blocked.

As shown in FIG. 2, the ring node 300 includes a plurality of ports 301, 302, 303, and the like, input and output processing units 310 provided in a number same as the number of the ports, a switching processing unit 320, a ring-management processing unit 330, a port-state managing unit 340, and an output-port-search processing unit 350. Different signs are affixed to the respective ports to distinguish links to which the ports are connected (see FIG. 1). However, the ports have completely the same function. In other words, although only internal configurations of the port 301 and the input and output processing unit 310 connected to the port 301 are shown, the other ports 302, 303, and the like and the input and output processing units 310 connected to these ports include the same internal configurations. Concerning the ports and the input and output processing units other than the port 301 and the input and output processing unit 310 connected to the port 301, connection lines (signal lines) to other components (such as the ring-management processing unit 330) excluding the switching processing unit 320 are not shown. However, it is assumed that the ports and the input and output processing units are connected in the same manner as the port 301 and the input and output processing unit 310.

The ports include input ports and output ports. For example, the port 301 includes an input port 301-1 and an output port 301-2. When these ports detect failures of links connected thereto or the own ports (the ports 301, 302, and the like), the ports notify the port-state managing unit 340 of the failures. The port 301 houses a link connected to the ring node 200, the port 302 houses a link connected to the ring node 400, and the port 303 houses a link to which the node 30 is connected (see FIG. 1).

The input and output processing units 310 respectively include input-frame processing units 311 and output-frame processing units 312 and perform multiplexing and separation of frames.

The input-frame processing unit 311 of the input and output processing unit 310 analyzes a received frame. If the received frame is a ring management frame based on the ERP, the input-frame processing unit 311 transfers the received frame to the ring-management processing unit 330. When a link management frame for link with an adjacent ring node described in "ITU-T Recommendation Y.1731, OAM Functions and Mechanisms for Ethernet based Networks" (hereinafter referred to as "Ether OAM function") is received, the input-frame processing unit 311 transfers the link management frame to the port-state managing unit 340. When transferring the ring management frame and the link management frame, the input-frame processing unit 311 notifies the port-state managing unit 340 of ports in which the frames are received. When a general frame is received, the input-frame processing unit 311 notifies the output-port-search processing unit 350 of a destination MAC address of the received frame and requests the output-port-search processing unit 350 to search for an output port. When an output port is notified from the output-port-search processing unit 350, the input-frame processing unit 311 notifies the switching processing unit 320 of the output port, passes the received frame to the switching processing unit 320, and requests the switching processing unit 320 to transfer the frame. The output port notified by the input-frame processing unit 311 can be one output port or can be a plurality of output ports. In the case of flooding, a plurality of ports are notified. The input-frame processing unit 311 notifies the output-port-search processing unit 350 of a port in which a frame is received and a transmission source MAC address of the received frame and requests the output-port-search processing unit 350 to update the FDB.

The output-frame processing unit 312 of the input and output processing unit 310 multiplexes a frame transferred from another input and output processing unit 310 through the switching processing unit 320, a frame received from the ring-management processing unit 330, and a frame received from the port-state managing unit 340 and transfers a multiplexed frame to the port 301 (an output port unit).

The ring-management processing unit 330 is a processing unit that performs ring management based on the ERP. The ring-management processing unit 330 performs instructions for transmission and reception of a ring management frame and operations that the port-state managing unit 340 should perform according to occurrence and elimination of a failure. When a port failure of the own ring node is detected and when a failure in a link connected to the own ring node is detected, the ring-management processing unit 330 generates, as a ring management frame, a failure notification frame for notifying details of the failure. When failure occurrence is notified from another ring node and when failure occurrence is detected in the own ring node, the ring-management processing unit 330 instructs the port-state managing unit 340 to execute FDB flush.

Figure 3:
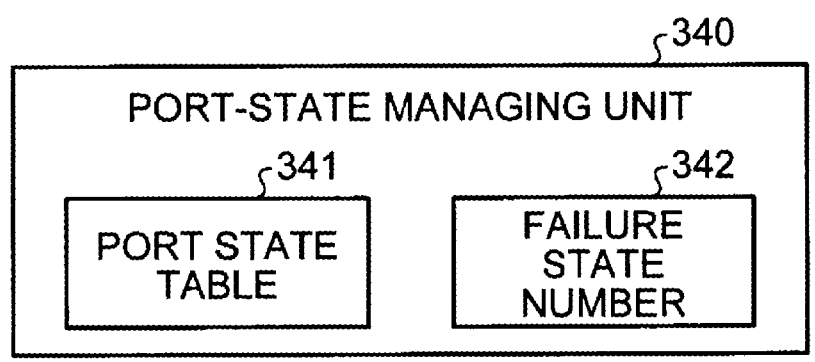
FIG. 3 is a diagram of an internal configuration of a port-state managing unit.

FIG. 3 is a diagram of an internal configuration of the port-state managing unit 340. As shown in the figure, the port-stage managing unit 340 manages a port state table 341 and a failure state number 342. In the port state table 341, states of all the ports of the ring node 300 are stored. The failure state number 342 is information for managing a state (a failure occurrence state) of the ring network 1.

When a port failure is notified from any one port of the ports, the port-state managing unit 340 (equivalent to state managing means) updates a state of the port in the port state table 341 (records failure occurrence), updates the failure state number 342, and notifies the ring-management processing unit 330 of the failure occurrence and the port in which the failure occurs.

Further, the port-state managing unit 340 monitors, based on the Ethernet OAM function, a state of link with an adjacent ring node. When a link failure is detected, as in the case of the notification of the port failure, the port-state managing unit 340 notifies the ring-management processing unit 330 of failure occurrence and a port connected to a failure occurrence link (a link in which the failure occurs).

Figure 4:
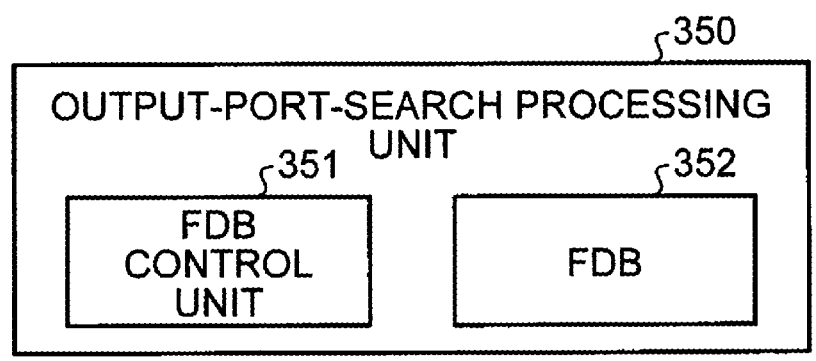
FIG. 4 is a diagram of a configuration example of an output-port-search processing unit.

FIG. 4 is a diagram of a configuration example of the output-port-search processing unit 350. The output-port-search processing unit 350 includes an FDB control unit 351 and an FDB 352. When a search request for an output port is received from the input-frame processing unit 311, the FDB control unit 351 searches through the FDB 352 to find an output port and notifies the input-frame processing unit 311 of the output port. When an FDB entry corresponding to the search request is absent in the FDB 352, the FDB control unit 351 instructs the input-frame processing unit 311 to perform flooding. When an update request for an FDB is received from the input-frame processing unit 311, the FDB control unit 351 performs, based on a MAC frame or the like notified during the update request, entry addition/update processing for the FDB 352. The FDB control unit 351 operates as a database updating unit and an output-destination determining unit.

Subsequently, an operation (an address learning operation) in which the ring node configuring the ring network 1 according to this embodiment updates an FDB is explained.

Figure 5:
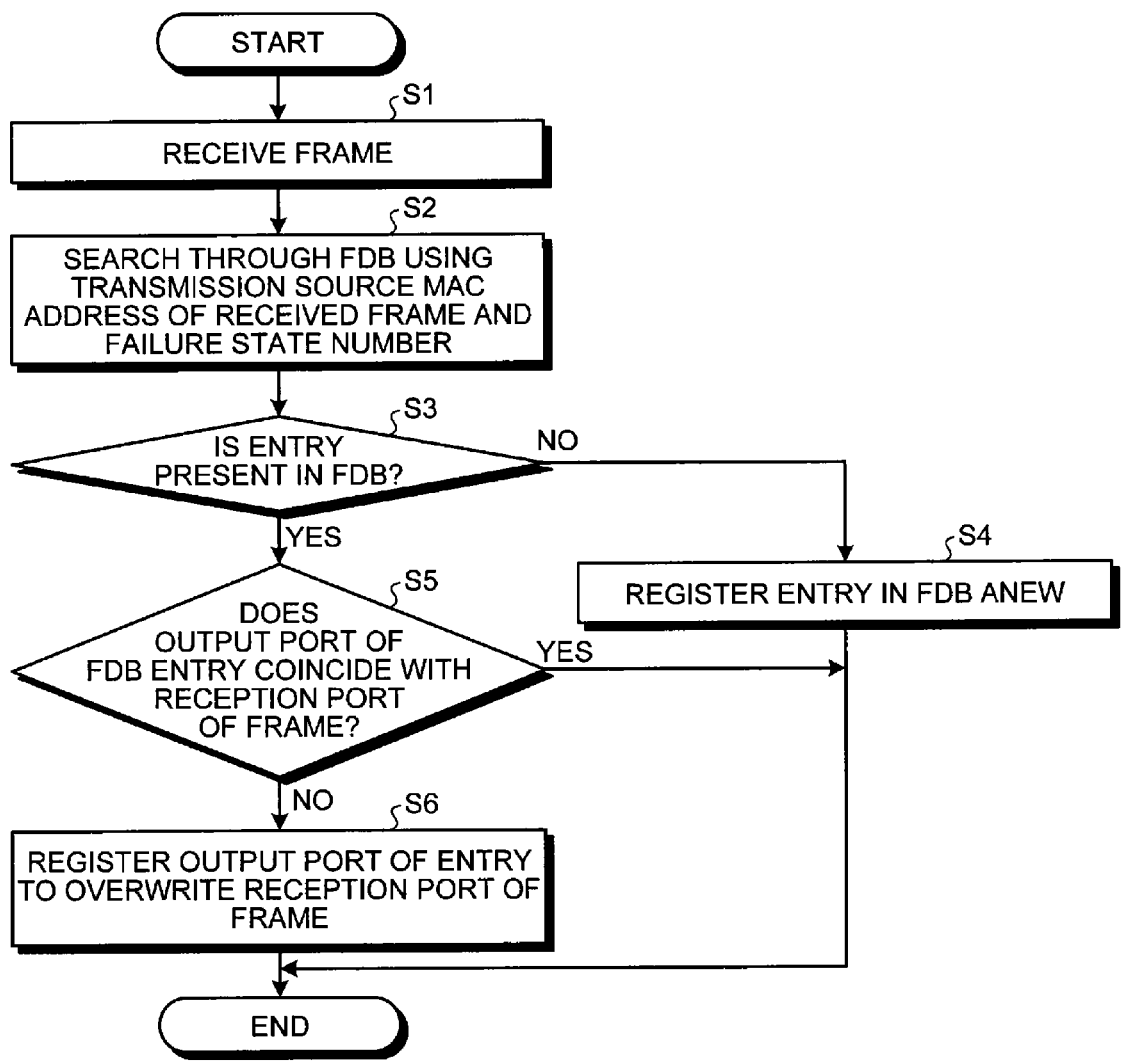
FIG. 5 is a flowchart for explaining an example of an FDB update procedure in the ring node according to the first embodiment.

FIG. 5 is a flowchart for explaining an example of a FDB update procedure in the ring node according to this embodiment.

Operation in Registering a New Entry in an FDB

First, an address learning operation in registering a new entry in an FDB is explained with reference to the drawing. An operation example in performing address learning from a state in which the ring node 300 has learned nothing (a state in which no entry is registered in the FDB 352) is explained. It is assumed that 0 is stored as a failure state number in the failure state number 342 of the port-state managing unit 340.

For example, when a frame (a general frame) transmitted from the node 50 connected to the ring node 500 and transferred by the ring node 500 is received in the port 302, the received frame is passed to the input-frame processing unit 311 connected to the port 302 (step S1). The input-frame processing unit 311 notifies the output-port-search processing unit 350 of a MAC address of the node 50, which is a transmission source MAC address of the received frame, and the port 302 in which the frame is received and requests the output-port-search processing unit 350 to update the FDB. In the output-port-search processing unit 350 that receives the update request for the FDB, the FDB control unit 351 searches through the FDB 352 using, as search keys, the notified MAC address and the failure state number 0 stored in the failure state number 342 of the port-state managing unit 340 and checks whether an entry is present in the FDB (steps S2 and S3). At this point, because the FDB 352 has learned nothing, the FDB control unit 351 determines that an FDB entry is absent (No at step S3) and updates the FDB 352 based on information notified by the update request for the FDB and a current failure state number. Specifically, the FDB control unit 351 registers anew, in the FDB 352, an FDB entry in which the MAC address of the node 50 notified by the update request for the FDB and the current failure state number 0 are the search keys and output information (an output port) corresponding to the search keys is the port 302 notified by the update request for the FDB (step S4).

Figures 6, 7:
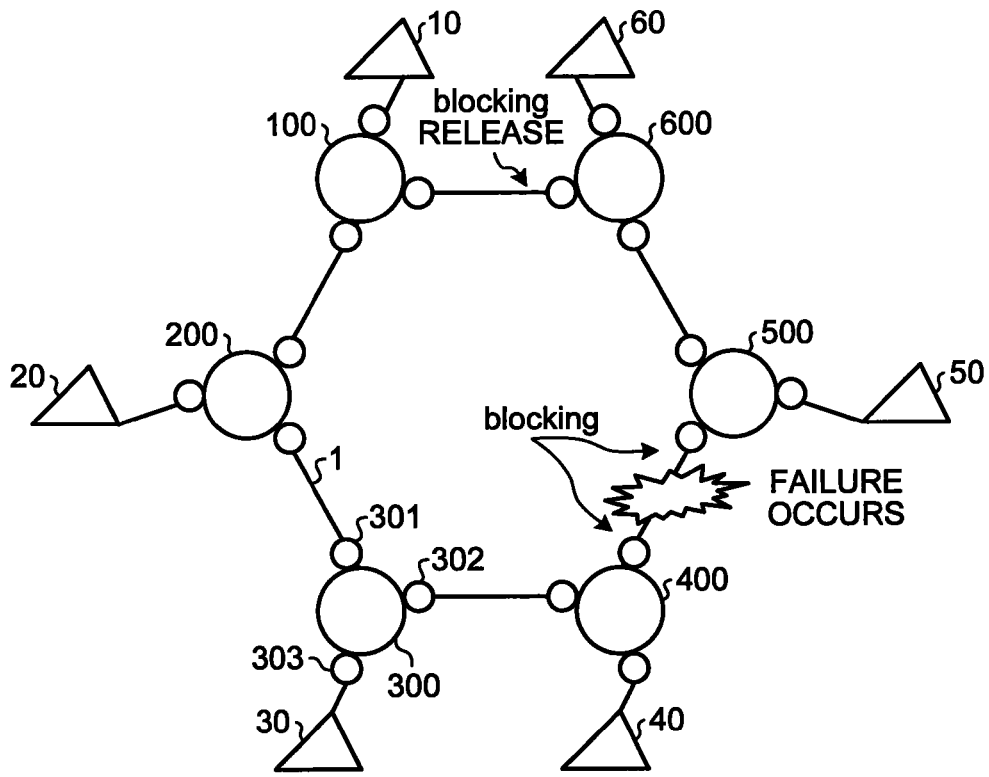
FIG. 6 is a diagram of an example of information registered in an FDB.
FIG. 7 is a diagram of an example of a failure that occurs in a ring network.

When frames (general frames) transmitted from the other ring nodes are received, similarly, steps S1 to S4 are executed to perform update of the FDB (address learning) and create the FDB 352 shown in FIG. 6 in which an entry including a MAC address, a failure state number, and an output port is registered.

Operation in Updating an Entry Registered in an FDB

An address learning operation in updating an entry registered in an FDB is explained. A re-learning operation performed when a frame transmitted by the node 50 is received from the port 302 in a state in which an output port of the MAC address of the node 50 is registered as the port 301 in the FDB 352 is explained with reference to the drawing. It is assumed that 0 is stored as a failure state number in the failure state number 342 of the port-state managing unit 340.

When a frame (a general frame) transmitted from the node 50 connected to the ring node 500 and transferred by the ring node 500 is received in the port 302, the received frame is passed to the input-frame processing unit 311 connected to the port 302 (step S1). The input-frame processing unit 311 notifies the output-port-search processing unit 350 of the MAC address of the node 50, which is a transmission source MAC address of the received frame, and the port 302 in which the frame is received and requests the output-port-search processing unit 350 to update the FDB. In the output-port-search processing unit 350 that receives the update request for the FDB, the FDB control unit 351 searches through the FDB 352 using, as search keys, the notified MAC address and the failure state number 0 stored in the failure state number 342 of the port-state managing section 340 and checks whether an entry is present in the FDB (steps S2 and S3). In this case, an entry in which the MAC address of the node 50 and the failure state number 0 are the search keys is present in the FDB 352 (Yes at step S3). Therefore, the FDB control unit 351 checks whether an output port registered in the found entry and the port 302 notified by the update request for the FDB coincide with each other (step S5). As a result of the check, the output port and the port 302 do not coincide with each other (No at step S5). Therefore, the FDB control unit 351 registers the output port of the entry found at step S2 to overwrite the port 302 notified by the update request for the FDB (step S6). When the output port registered in the found entry and the port notified by the update request for the FDB coincide with each other (Yes at step S5), the FDB control unit 351 ends the processing without updating the FDB 352.

In the explanation of the address learning operation referring to FIG. 5, for simplification of explanation, an operation for transferring the received frame is not described. Actually, in addition to the address learning operation explained above, processing for performing output port search using a destination MAC address of the received frame and transferring the frame according to a search result is also carried out. Detailed explanation of this frame transfer operation is omitted because the frame transfer operation is the same as that in the past. In the following explanation, when the address learning operation is explained, similarly, a transfer operation for a received frame is not explained.

Subsequently, an operation performed by the ring nodes when a failure occurs in the ring network 1 shown in FIG. 1 is explained. As an example, an operation performed by the ring node 300 when a failure occurs in a link between the ring nodes 400 and 500 (see FIG. 7) is explained. It is assumed that, when a failure occurs, 0 is stored as a failure state number in the failure state number 342 of the port-state managing unit 340.

When the ring node 400 detects a failure of the link connected to the ring node 500, the ring node 400 transmits a failure notification frame, which is a ring management frame for notifying that the failure is detected, to a link connected to the ring node 300. Similarly, when the ring node 500 detects a failure, the ring node 500 transmits a failure notification frame to a link connected to the ring node 600. The ring nodes 400 and 500 block ports that house the link in which the failures are detected. When the ring node 600 receives the failure notification frame, the ring node 600 releases blocking of a port that houses a link between the ring node 600 and the ring node 100 (see FIG. 7).

In the ring node 300, when the failure notification frame is received from the ring node 400, the input and output processing unit 310 and the switching processing unit 320 transfer the failure notification frame to a link connected to the ring node 200. The failure notification frame is transferred from the input and output processing unit 310 to the ring-management processing unit 330.

When the ring-management processing unit 330 receives the transferred failure notification frame, the ring-management processing unit 330 checks content of the failure notification frame and determines whether it is necessary to disable an FDB entry in which the port 302, which is a port that houses a link through which the failure notification frame is transmitted, is an output port. The ring-management processing unit 330 instructs the port-state managing unit 340 and the output-port-search processing unit 350 to execute the FDB flush.

The port-state managing unit 340 that receives the FDB flush execution instruction updates the failure state number 342. The port-state managing unit 340 updates the failure state number 342 from 0 to 1.

In the output-port-search processing unit 350 that receives the FDB flush execution instruction, the FDB control unit 351 sets, at the top of the FDB 352, a free entry learned by the FDB 352 next. In general, all entries of the FDB are disabled. However, in the ring node according to this embodiment, processing for disabling all entries of the FDB is not performed.

A purpose of disabling the FDB entries is to forget a frame transfer destination before a failure to prevent a frame from not being allowed to reach a desired destination because the frame is relayed to a frame transfer destination learned before the failure. However, as explained above, in the ring node according to this embodiment, all the entries of the FDB are not disabled immediately after notification of failure occurrence is received. A reason why the disabling of all the entries of the FDB is unnecessary in the ring node according to this embodiment is explained with reference to a specific example.

Figure 8:
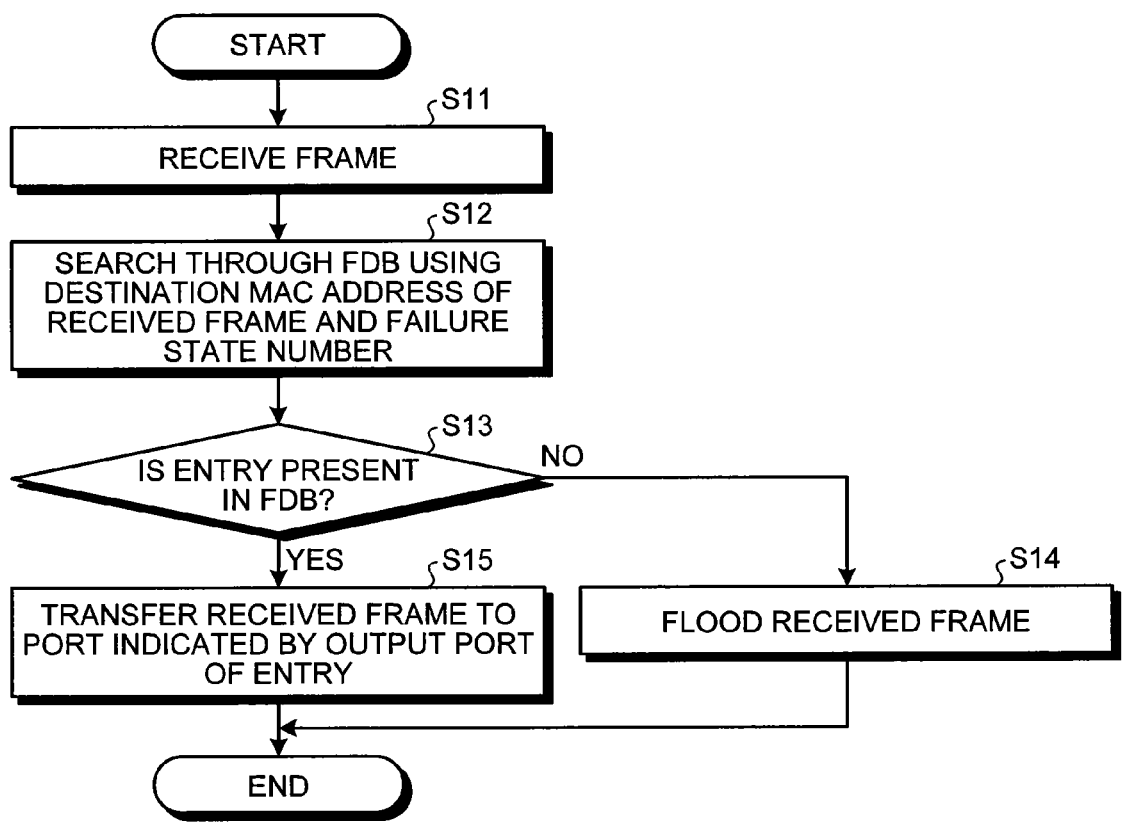
FIG. 8 is a flowchart for explaining a frame transfer procedure by the ring node according to the first embodiment.

An operation performed when the FDB 352 of the ring node 300 is in a state shown in FIG. 6, the notification of failure occurrence in the link between the ring nodes 400 and 500 is received in this state, and, thereafter, the port 301 receives a frame addressed to the node 50 connected to the ring node 500, specifically, an operation for searching for an output port of a frame and an operation for transmitting the frame according to a search result, which is an operation carried out when the frame is received, are explained with reference to a flowchart shown in FIG. 8. FIG. 8 is a flowchart for explaining a frame transfer procedure carried out after the failure occurrence notification is received.

As explained above, at a point when the failure occurrence notification is received, the FDB control unit 351 of the output-port-search processing unit 350 does not change an entry registered in the FDB 352. Therefore, the FDB 352 immediately after the failure occurrence notification is received is in the state shown in FIG. 6. At this point, the FDB control unit 351 sets, at the top of the FDB 352, a free entry learned by the FDB 352 next. It is assumed that 1 is stored as a failure state number (updated from 0 to 1 according to the failure occurrence notification) in the failure state number 342 of the port-state managing section 340.

The ring node 300 receives, in the port 301, for example, a frame in which the MAC address of the node 50 connected to the ring node 500 is set as a destination MAC address (step S11). The input and output processing unit 310 requests the output-port-search processing unit 350 to search through the FDB 352 using the MAC address of the node 50 as a search key (a search request for an output port). In the output-port-search processing unit 350 that receives the search request for an output port, the FDB control unit 351 searches through the FDB 352 using, as search keys, the MAC address of the node 50 notified during the request and a value (1 in this case) of the failure state number stored in the failure state number 342 and checks whether an entry corresponding to the request content is present (steps S12 and S13). At this point, in the FDB 352, the MAC address of the node 50 is learned as a set of the MAC address and the failure state number value 0 but is not learned as a set of the MAC address and the failure state number 1. Therefore, the FDB control unit 351 determines that an entry corresponding to the request content is absent (No at step S13) and notifies the input and output processing unit 310 to that effect. The input and output processing unit 310 that receives the notification of absence of the entry corresponding to the request content copies the received frame and requests the switching processing unit 320 to transfer (flood) the frame to the ports (the ports 302, 303, and the like) other than the port 301 in which the frame is received. The switching processing unit 320 floods the frame received in the port 301 according to the request content (step S14). When the FDB control unit 351 finds an entry corresponding to the request content (Yes at step S13), the FDB control unit 351 notifies the input and output processing unit 310 of an output port registered in the found entry. The input and output processing unit 310 and the switching processing unit 320 transfer the received frame to the notified output port (step S15).

As explained above, the failure state number value and the MAC address before failure occurrence are stored in the FDB as the search keys. Therefore, after the failure state number is updated, an entry before the update is disabled. Therefore, it is possible to obtain an effect same as disabling of all the entries without disabling all the entries after the failure occurrence. Because the failure state number value is only updated, in the communication apparatus (the ring node apparatus) according to this embodiment, it is possible to substantially reduce a processing time compared with the processing for disabling all the entries of the FDB carried out in the past. In the processing in the past, time required for the processing increases according to an increase of the number of entries required to be disabled. However, in the method explained above applied in the communication apparatus according to this embodiment, the processing time does not increase even if the number of entries increases.

FDB learning after failure occurrence is explained with reference to FIGS. 9 and 10. FIGS. 9 and 10 are diagrams of an example of an FDB learning operation after failure occurrence.

As explained above, in the ring nodes, when a failure notification is received, the top of a free entry is set as the top of the FDB. For example, in the ring node 300, the top of the free entry is set as the top of the FDB 352. Thereafter, entries learned anew in the ring node 300 are added to overwrite entries in order from the top of the FDB 352. FIG. 9 is a diagram of an example of the FDB 352 in which new entries are learned after failure occurrence. In the example shown in FIG. 9, after the failure occurrence, first, an output port of the node 30 is learned. Therefore, an entry concerning the node 30 is registered in the top entry (an entry number 1). Because learning does not progress yet, an entry of the node 30 in which the failure state number is the previous failure state number (0) also remains in an entry number 3. When new learning is performed next, this entry is overwritten. When address learning sequentially progresses in this way, the FDB 352 is updated to, for example, a state shown in FIG. 10.

To obtain an effect equivalent to the effect of the processing for disabling all the entries of the FDB in the past (a frame is prevented from being relayed to a frame transfer destination learned before a failure), when a failure notification is received, an operation for setting the top of the free entry as the top of the FDB is not essential. However, when a search processing time for an output port is taken into account, it is desirable to set the top of the free entry as the top of the FDB and prevent the number of registered entries in the FDB (the number of entries to be searched) from increasing more than necessary.

However, the setting of the top of the free entry as the top of the FDB is only an example for realizing the prevention of an increase in the number of registered entries. In the address learning, if an entry having a failure state number (an old failure state number) different from a current failure state number (a latest failure state number) is present, a new entry only has to be registered to overwrite the entry. If an entry having the old failure state number is absent, a new entry only has to be registered in an unused entry (an area in which a destination MAC address and an output port are not registered at all). In other words, new entries can be registered to overwrite entries having old failure state numbers in any order.

As explained above, the ring node according to this embodiment updates, every time notification of failure occurrence in the ring network is received, a management number (a failure state number) indicating a network state at a point when FDB learning is performed. When the address learning is performed according to reception of a general frame to update the FDB (a new entry is registered in the FDB or a registered entry is changed), the ring node registers a failure state number at that point and a transmission source MAC address of a received frame in an entry as search keys. Consequently, in the output port search, when a MAC address and a failure state number coincide with each other, an output port (a transfer destination) of the received frame is specified. The frame is not transferred to an output port learned before the failure occurrence. Therefore, when a failure occurs, the processing for disabling all the entries of the FDB necessary from the past is unnecessary. As a result, a required time from failure occurrence in the ring network until the address learning is resumed is reduced.

Second Embodiment

In the first embodiment, the ring node that disables, when notification of failure occurrence is received, all the entries registered in the FDB is explained. In a second embodiment, a ring node that disables only an FDB entry having a specific output port is explained. It is assumed that the configuration of a communication system is the same as that in the first embodiment (see FIG. 1).

Figures 11, 12:
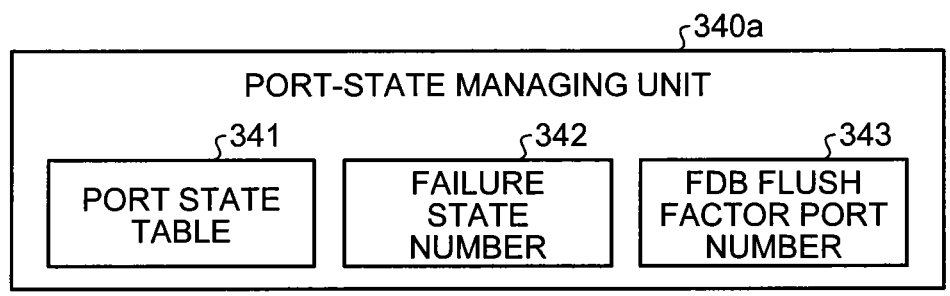
FIG. 11 is a diagram of a configuration example of an FDB managed by a ring node according to a second embodiment.
FIG. 12 is a diagram of a configuration example of information managed by a port-state managing unit included in the ring node according to the second embodiment.

In the ring node according to this embodiment, a search key for an FDB is only a MAC address as in the past. Information output by FDB search is a failure state number and an output port (see FIG. 11). FIG. 11 is a diagram of a configuration example of an FDB managed by the ring node according to this embodiment. The failure state number is the same as the failure state number explained in the first embodiment. In this embodiment, as in the first embodiment explained above, an operation example of the ring node 300 is explained.

FIG. 12 is a diagram of a configuration example of information managed by a port-state managing unit included in the ring node 300 according to this embodiment. As shown in the figure, a port-state managing unit 340a of the ring node 300 manages an FDB flush factor port number 343 in addition to the port state table 341 and the failure state number 342 managed by the port-stage managing unit 340 (see FIG. 3) explained in the first embodiment. The FDB flush factor port number 343 is a number of a port in which a failure notification frame is received.

The ring node 300 according to this embodiment is the same as the ring node explained in the first embodiment except the port-state managing unit 340a.

When the port-state managing unit 340a receives an instruction for execution of FDB flush from the ring-management processing unit 330, the port-state managing unit 340a updates a value of the failure state number 342 and stores, in the FDB flush factor port number 343, a number of a port (an FDB flush factor port number) notified when the execution instruction for the FDB flush is received.

Subsequently, an operation (an address learning operation) in which the ring nodes configuring the ring network 1 according to this embodiment update FDBs is explained.

Figure 13:
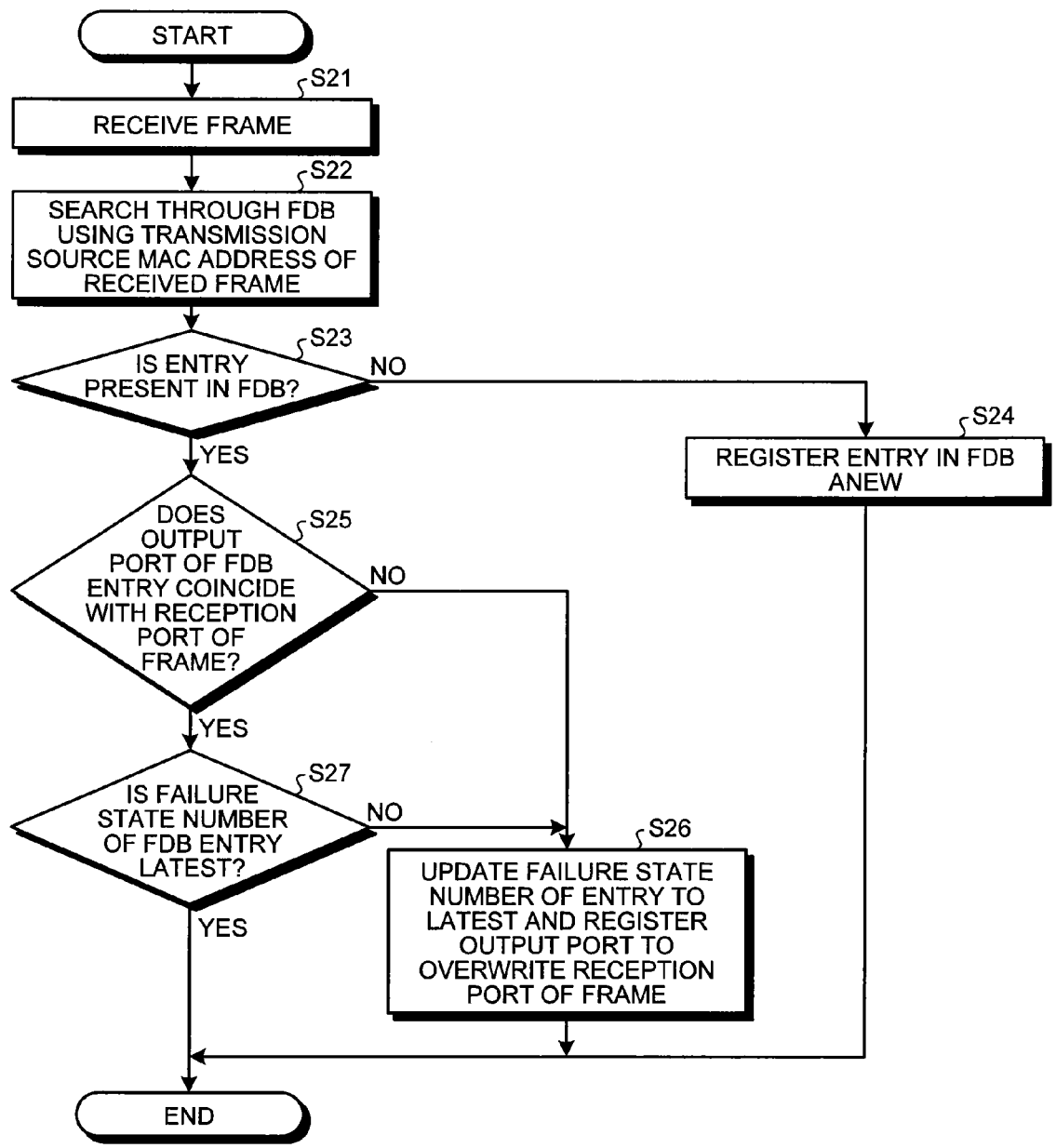
FIG. 13 is a flowchart for explaining an example of an FDB update procedure in the ring node according to the second embodiment.

FIG. 13 is a flowchart for explaining an example of a FDB update procedure in the ring node according to this embodiment.

Operation in Registering a New Entry in an FDB

First, an address learning operation in registering a new entry in an FDB is explained with reference to the drawing. An operation example in performing address learning from a state in which the ring node 300 has learned nothing (a state in which no entry is registered in the FDB 352) is explained. It is assumed that 0 is stored as a failure state number in the failure state number 342 of the port-state managing unit 340.

For example, when a frame (a general frame) transmitted from the node 50 connected to the ring node 500 and transferred by the ring node 500 is received in the port 302, the received frame is passed to the input-frame processing unit 311 connected to the port 302 (step S21). The input-frame processing unit 311 notifies the output-port-search processing unit 350 of a MAC address of the node 50, which is a transmission source MAC address of the received frame, and the port 302 in which the frame is received and requests the output-port-search processing unit 350 to update the FDB. In the output-port-search processing unit 350 that receives the update request for the FDB, the FDB control unit 351 searches through the FDB 352 using the notified MAC address as a search key and checks whether an entry is present in the FDB (steps S22 and S23). At this point, because the FDB 352 has learned nothing, the FDB control unit 351 determines that an FDB entry is absent (No at step S23) and updates the FDB 352 based on information notified by the update request for the FDB and a current failure state number. Specifically, the FDB control unit 351 registers anew, in the FDB 352, an FDB entry in which the MAC address of the node 50 notified by the update request for the FDB is the search key and output information (a failure state number and an output port) corresponding to the search key is the current failure state number 0 and the port 302 notified by the update request for the FDB (step S24).

When general frames transmitted from the other ring nodes are received, similarly, steps S21 to S24 are executed to update the FDB.

Operation in Updating an Entry Registered in an FDB

An address learning operation in updating an entry registered in an FDB is explained. (1) An updating operation performed when a port in which a frame is received and a port indicated by an entry registered in the FDB do not coincide with each other and (2) an updating operation performed when a failure state number at a point when a frame is received and a failure state number registered in the FDB do not coincide with each other are explained.

(1) Updating operation performed when a port in which a frame is received and a port indicated by an entry registered in the FDB do not coincide with each other As an example, a re-learning operation performed when a frame transmitted by the node 50 is received from the port 302 in a state in which an output port of the MAC address of the node 50 is registered as the port 301 in the FDB 352 is explained.

When a frame (a general frame) transmitted from the node 50 connected to the ring node 500 and transferred by the ring node 500 is received in the port 302, the received frame is passed to the input-frame processing unit 311 connected to the port 302 (step S21). The input-frame processing unit 311 notifies the output-port-search processing unit 350 of the MAC address of the node 50, which is a transmission source MAC address of the received frame, and the port 302 in which the frame is received and requests the output-port-search processing unit 350 to update the FDB. In the output-port-search processing unit 350 that receives the update request for the FDB, the FDB control unit 351 searches through the FDB 352 using the notified MAC address as a search key and checks whether an entry is present in the FDB (steps S22 and S23). In this case, an entry in which the MAC address of the node 50 is the search key is present in the FDB 352 (Yes at step S23). Therefore, the FDB control unit 351 checks whether an output port registered in the found entry and the port 302 notified by the update request for the FDB coincide with each other (step S25). As a result of the check, the output port and the port 302 do not coincide with each other (No at step S25). Therefore, the FDB control unit 351 registers the entry found at step S22 to overwrite the entry of the FDB 352 by respectively overwriting the port 302 and the current failure state number 0 notified by the update request for the FDB with the output port and the failure state number of the found entry (step S26).

(2) Updating operation performed when a failure state number at a point when a frame is received and a failure state number registered in the FDB do not coincide with each other As an example, a re-learning operation performed when a frame transmitted by the node 50 is received from the port 302 in a state in which an output port of the MAC address of the node 50 is registered as the port 302 and a state number corresponding to the port 302 is registered as 0 in the FDB 352 is explained. It is assumed that 1 is stored as a failure state number in the failure state number 342 of the port-state managing section 340.

When a frame (a general frame) transmitted from the node 50 connected to the ring node 500 and transferred by the ring node 500 is received in the port 302, the received frame is passed to the input-frame processing unit 311 connected to the port 302 (step S21). The input-frame processing unit 311 notifies the output-port-search processing unit 350 of the MAC address of the node 50, which is a transmission source MAC address of the received frame, and the port 302 in which the frame is received and requests the output-port-search processing unit 350 to update the FDB. In the output-port-search processing unit 350 that receives the update request for the FDB, the FDB control unit 351 searches through the FDB 352 using the notified MAC address as a search key and checks whether an entry is present in the FDB (steps S22 and S23). In this case, an entry in which the MAC address of the node 50 is the search key is present in the FDB 352 (Yes at step S23). Therefore, the FDB control unit 351 checks whether an output port registered in the found entry and the port 302 notified by the update request for the FDB coincide with each other (step S25). As a result of the check, the FDB control unit 351 determines that the output port and the port 302 coincide with each other (Yes at step S25) and further checks whether a failure state number registered in the found entry and a current failure state number (a failure state number stored in the failure state number 342) coincide with each other (step S27). As a result of the check, the failure state number and the current failure state number do not coincide with each other (No at step S27). Therefore, the FDB control unit 351 registers the entry found at step S22 to overwrite the entry of the FDB 352 by respectively overwriting the port 302 and the current failure state number 0 notified by the update request for the FDB with the output port and the failure state number of the found entry (step S26). When the failure state number and the output port registered in the found entry and the current failure state number and the port notified by the update request for the FDB coincide with each other (Yes at step S27), the FDB control unit 351 ends the processing without updating the FDB 352.

Subsequently, an operation performed by the ring nodes when a failure occurs in the ring network 1 according to this embodiment is explained. As an example, as in the explanation in the first embodiment, an example of an operation performed by the ring node 300 when a failure occurs in the link between the ring nodes 400 and 500 (see FIG. 7) is explained. It is assumed that, when a failure occurs, 0 is stored as a failure state number in the failure state number 342 of the port-state managing unit 340.

When the ring nodes 400 and 500 detect a failure of the link, the ring nodes 400 and 500 transmit a failure notification frame indicating to that effect.

As a result, the ring node 300 receives the failure detection frame transmitted from the ring node 400. In this case, in the ring node 300, the input and output processing unit 310 and the switching processing unit 320 transfer the failure notification frame to a link connected to the ring node 200. The failure notification frame is transferred from the input and output processing unit 310 to the ring-management processing unit 330.

When the ring-management processing unit 330 receives the transferred failure notification frame, the ring-management processing unit 330 checks content of the failure notification frame and determines whether it is necessary to disable an FDB entry in which the port 302, which is a port that houses a link through which the failure notification frame is transmitted, is an output port. The ring-management processing unit 330 instructs the port-state managing unit 340a and the output-port-search processing unit 350 to execute the FDB flush.

The port-state managing unit 340 that receives the FDB flush execution instruction updates the failure state number 342. The port-state managing unit 340 updates the failure state number 342 from 0 to 1. Further, the port-state managing unit 340 stores identification information (a port number) of the notified port 302 in the FDB flush factor port number 343.

A reason why the disabling of all the entries of the FDB is unnecessary in the ring node according to this embodiment is explained with reference to a specific example.

An operation (a frame transfer operation) executed when the FDB 352 of the ring node 300 is in a state shown in FIG. 11, the notification of failure occurrence in the link between the ring nodes 400 and 500 is received in this state, and, thereafter, the port 303 receives a frame addressed to the node 50 connected to the ring node 500 is explained with reference to a flowchart shown in FIG. 14. FIG. 14 is a flowchart for explaining a frame transfer procedure carried out after the failure occurrence notification is received. It is assumed that 1 is stored as the failure state number (the failure state number is updated from 0 to 1 according to the failure occurrence notification) in the port-state managing unit 340 and the failure state number 342.

The frame transfer procedure shown in FIG. 14 is explained below. The frame transfer procedure is divided into (A) a frame transfer procedure performed when an entry corresponding to a destination MAC address of a received frame is absent in the FDB 352, (B) a frame transfer procedure performed when an entry corresponding to a destination MAC address of a received frame is present in the FDB 352 and a failure state number of an obtained entry is equal to a value stored in the failure state number 342, (C) a frame transfer procedure performed when an entry corresponding to a destination MAC address of a received frame is present in the FDB 352, a failure state number of an obtained entry is different from a value stored in the failure state number 342, and an output port of the obtained entry is different from the FDB flush factor port number 343, and (D) a frame transfer procedure performed when an entry corresponding to a destination MAC address of a received frame is present in the FDB 352, a failure state number of an obtained entry is different from a value stored in the failure state number 342, and an output port of the obtained entry is equal to the FDB flush factor port number 343.

(A) Frame transfer performed when an entry corresponding to a destination MAC address of a received frame is absent in the FDB 352

The ring node 300 receives, for example, a frame addressed to the node 50 in the port 303 (step S31). The input and output processing unit 310 requests the output-port-search processing unit 350 to search through the FDB 352 using the MAC address of the node 50 as a search key (a search request for an output port). In the output-port-search processing unit 350 that receives the search request for an output port, the FDB control unit 351 searches through the FDB 352 using, as a search key, the MAC address of the node 50 notified during the request and checks whether an entry corresponding to the request content is present (steps S32 and S33). Therefore, the FDB control unit 351 determines that an entry corresponding to the request content is absent (No at step S33) and notifies the input and output processing unit 310 to that effect. The input and output processing unit 310 that receives the notification of absence of the entry corresponding to the request content copies the received frame and requests the switching processing unit 320 to transfer (flood) the frame to the ports other than the port 303 in which the frame is received. The switching processing unit 320 floods the frame received in the port 303 according to the request content (step S34).

(B) Frame transfer performed when an entry corresponding to a destination MAC address of a received frame is present in the FDB 352 and a failure state number of an obtained entry is equal to a value stored in the failure state number 342

The ring node 300 receives, for example, a frame addressed to the node 50 in the port 303 (step S31). The input and output processing unit 310 requests the output-port-search processing unit 350 to search through the FDB 352 using the MAC address of the node 50 as a search key (a search request for an output port). In the output-port-search processing unit 350 that receives the search request for an output port, the FDB control unit 351 searches through the FDB 352 using, as a search key, the MAC address of the node 50 notified during the request and checks whether an entry corresponding to the request content is present (steps S32 and S33). The FDB control unit 351 acquires an entry corresponding to the search key (Yes at step S33) and further checks whether a failure state number registered in the entry is the latest. In other words, the FDB control unit 351 checks whether the registered failure state number coincides with a failure state number stored in the failure state number 342 (step S35). The FDB control unit 351 determines that the failure state number of the acquired entry is the latest (Yes at step S35) and notifies the input and output processing unit 310 of an output port registered in the entry. The input and output processing unit 310 that receives the notification requests the switching processing unit 320 to transfer the received frame to the notified output port. The switching processing unit 320 transfers the received frame (step S38).

(C) Frame transfer performed when an entry corresponding to a destination MAC address of a received frame is present in the FDB 352, a failure state number of an obtained entry is different from a value stored in the failure state number 342, and an output port of the obtained entry is different from the FDB flush factor port number 343

This is an operation performed when an entry obtained in the output port search is an entry learned before failure occurrence but is an entry of a destination that does not require a path change due to a failure.

The ring node 300 receives, for example, a frame addressed to the node 50 in the port 303 (step S31). The input and output processing unit 310 requests the output-port-search processing unit 350 to search through the FDB 352 using the MAC address of the node 50 as a search key (a search request for an output port). In the output-port-search processing unit 350 that receives the search request for an output port, the FDB control unit 351 searches through the FDB 352 using, as a search key, the MAC address of the node 50 notified during the request and checks whether an entry corresponding to the request content is present (steps S32 and S33). The FDB control unit 351 acquires an entry corresponding to the search key (Yes at step S33) and further checks whether a failure state number registered in the entry is the latest. In other words, the FDB control unit 351 checks whether the registered failure state number coincides with a failure state number stored in the failure state number 342 (step S35). The FDB control unit 351 determines that the failure state number of the acquired entry is not the latest (No at step S35) and further checks whether an output port number registered in the acquired entry corresponds to an FDB flush factor port number (step S36). In other words, the FDB control unit 351 checks whether the output port number registered in the entry coincides with a value of the FDB flush factor port number 343 of the port state managing unit 340a. In this case, because the output port number does not coincide with the value of the FDB flush factor port number 343, the FDB control unit 351 determines that the output port number does not correspond to the FDB flush factor port number (No at step S36). The FDB control unit 351 updates the failure state number registered in the acquired entry to a value of the failure state number 342 of the port state managing unit 340a and registers an entry after the update to overwrite the acquired entry (step S37). The FDB control unit 351 notifies the input and output processing unit 310 of an output port registered in the entry. The input and output processing unit 310 that receives the notification requests the switching processing unit 320 to transfer the received frame to the notified output port. The switching processing unit 320 transfers the received frame (step S38).

(D) Frame transfer performed when an entry corresponding to a destination MAC address of a received frame is present in the FDB 352, a failure state number of an obtained entry is different from a value stored in the failure state number 342, and an output port of the obtained entry is equal to the FDB flush factor port number 343

This is an operation performed when an entry obtained in the output port search is an entry learned before failure occurrence and is an entry of a destination that does not require a path change due to a failure.

The ring node 300 receives, for example, a frame addressed to the node 50 in the port 303 (step S31). The input and output processing unit 310 requests the output-port-search processing unit 350 to search through the FDB 352 using the MAC address of the node 50 as a search key (a search request for an output port). In the output-port-search processing unit 350 that receives the search request for an output port, the FDB control unit 351 searches through the FDB 352 using, as a search key, the MAC address of the node 50 notified during the request and checks whether an entry corresponding to the request content is present (steps S32 and S33). The FDB control unit 351 acquires an entry corresponding to the search key (Yes at step S33) and further checks whether a failure state number registered in the entry is the latest. In other words, the FDB control unit 351 checks whether the registered failure state number coincides with a failure state number stored in the failure state number 342 (step S35). The FDB control unit 351 determines that the failure state number of the acquired entry is not the latest (No at step S35) and further checks whether an output port number registered in the acquired entry corresponds to an FDB flush factor port number (step S36). The FDB control unit 351 determines that the output port number corresponds to the FDB flush factor port number (Yes at step S36) and disables this entry (step S39). A method of disabling the entry is not particularly specified. All of search keys and output information of the entry can be erased or only the search keys can be erased. A flag indicating that the entry is disabled (a flag indicating a free entry) can be prepared and set. The disabling can be performed by any other methods. After performing the disabling of the entry, the FDB control unit 351 notifies the input and output processing unit 310 of absence of the entry (an output port corresponding to the search request is unknown). The input and output processing unit 310 that receives the notification of absence of the entry copies the received frame and requests the switching processing unit 320 to transfer (flood) the frame to the ports other than the port 303 in which the frame is received. The switching processing unit 320 floods, according to the request content, the frame received in the port 303 (step S34).

As explained above, the ring node according to this embodiment updates, every time notification of failure occurrence in the ring network is received, a management number (a failure state number) indicating a network state at a point when FDB learning is performed, stores a reception port of a frame that notifies the failure occurrence (a failure notification frame) as an FDB flush factor port, performs address learning according to reception of a general frame, and, when updating the FDB, registers a transmission MAC address of the received frame as a search key and registers the failure state number at that point and the reception port of the frame as output information in an entry. In output port search in transferring the frame, when a failure state number registered in the entry corresponding to the search key is not a latest value and an output port registered in the entry corresponds to the FDB flush factor port, the ring node disables the entry. Consequently, the processing for disabling all entries of the FDB necessary in the past can be made unnecessary and only an FDB entry at a destination that is truly necessary can be disabled. As a result, when a failure occurs in the ring network, it is possible to quickly resume the address learning and make it unnecessary to perform a useless flooding operation to a node of a path not affected by path switching due to the failure.

In this embodiment, the method of setting an entry output to a specific port as a target of disabling is explained. However, depending on a network failure, disabling of all entries is necessary. Therefore, a value indicating all ports can be defined as the FDB flush factor port and, when disabling of all the entries is necessary, the value can be stored in the FDB flush factor port number 343.

In the first and second embodiments, the communication apparatus that operates as the node of the ring network is explained. However, the communication apparatus according to the present invention can be applied to a network that adopts topology other than a ring type as long as the network is a network in which nodes operate to disable an address learning result in the past according to failure occurrence in the network and perform address learning anew.

INDUSTRIAL APPLICABILITY

As explained above, the communication apparatus according to the present invention is useful for a node apparatus that configures a network and transfers a received frame according to an address learning result and is suitable for, in particular, a node apparatus that resumes, in a short time, address learning after failure occurrence.

REFERENCE SIGNS LIST 1 ring network
10, 20, 30, 40, 50, 60 nodes
100, 200, 300, 400, 500, 600 ring nodes
301, 302, 303 ports
301-1 input port
301-2 output port
310 input and output processing unit
311 input-frame processing unit
312 output-frame processing unit
320 switching processing unit
330 ring-management processing unit
340, 340a port-state managing units
341 port state table
342 failure state number
343 FDB flush factor port number
350 output-port-search processing unit 351 FDB control unit
352 FDB

The invention claimed is:

1. A communication apparatus that operates as a node of a network, the communication apparatus comprising:
- a state managing unit configured to update, every time failure occurrence in the network is detected, state information indicating a state of the network;
- a database comprising an entry indicating a correspondence relationship between a destination address of a received frame, the state information and an output port of the received frame;
- a database updating unit configured to update, based on a transmission source address and a reception port of a received frame and the state information managed by the state managing unit, the database for determining an output port when a frame in which the transmission source address is a destination address is received; and
- an output-destination determining unit including a processor and configured to determine an output port of the received frame by searching through the database using, as search keys, the destination address of the received frame and current failure state information managed by the state managing unit.

2. The communication apparatus according to claim 1, wherein the database updating unit creates an entry in which the transmission source address and the state information are search keys and the reception port is output information and registers the entry in the database.

3. The communication apparatus according to claim 1, wherein, when an entry in which the transmission source address of the received frame and the state information managed by the state managing unit are search keys is not registered in the database, the database updating unit creates an entry in which the transmission source address and the state information are search keys and the reception port is output information and registers the entry in the database.

4. The communication apparatus according to claim 1, wherein, when an entry in which the transmission source address of the received frame and the state information managed by the state managing unit are search keys is registered in the database but output information of the entry does not indicate the reception port, the database updating unit changes the entry such that the output information of the entry indicates the reception port.

5. The communication apparatus according to claim 1, wherein the communication apparatus configures a ring network.

6. A communication apparatus that operates as a node of a network, the communication apparatus comprising:
- a state managing unit configured to update, every time failure occurrence in the network is detected, state information indicating a state of the network and store, as a disabled port, a port in which the failure occurs or a port in which a frame for notifying the failure occurrence is received;
- a database comprising an entry indicating a correspondence relationship between a destination address of a received frame, the state information and an output port of the received frame;
- a database updating unit configured to update, based on a transmission source address and a reception port of a received frame and the state information managed by the state managing unit, the database for determining an output port when a frame in which the transmission source address is a destination address is received; and
- an output-destination determining unit including a processor and configured to search through the database using the destination address of the received frame as a search key and determine, based on the state information and the output port as an obtained search result and the disabled port stored by the state managing unit, an output port of the received frame.

7. The communication apparatus according to claim 6, wherein the database updating unit creates an entry in which the transmission source address is a search key and the state information and the reception port are output information and registers the entry in the database.

8. The communication apparatus according to claim 6, wherein, when an entry in which the transmission source address of the received frame is a search key is registered in the database but output information of the entry indicates a port different from the reception port or the output information includes state information different from the state information managed by the state managing unit, the database updating unit changes the entry such that the output information of the entry indicates the reception port and includes state information same as the state information managed by the state managing unit.

9. The communication apparatus according to claim 6, wherein, when the state information included in the search result is different from the state information managed by the state managing unit and an output port indicated by the search result corresponds to the disabled port stored by the state managing unit, the output-destination determining unit disables an entry in the database corresponding to the search result.

10. The communication apparatus according to claim 6, wherein, when the state information included in the search result is different from the state information managed by the state managing unit and an output port indicated by the search result is different from the disabled port stored by the state managing unit, the output-destination determining unit updates the entry such that an entry in the database corresponding to the search result includes management information same as the state information managed by the state managing unit.

11. The communication apparatus according to claim 10, wherein the output-destination determining unit determines that an output destination of the received frame is an output port indicated by the search result.

12. The communication apparatus according to claim 6, wherein the communication apparatus configures a ring network.

13. An address learning method that a communication apparatus, which operates as a node of a network, executes in updating a database comprising an entry indicating a correspondence relationship between a destination address of a received frame, state information indicating a state of the network and an output port of the received frame, the address learning method comprising:
- updating, every time failure occurrence in the network is detected, the state information managed separately from the database;
- determining an output port of the received frame by searching through the database using, as search keys, the destination address of the received frame and current failure state information managed separately from the database; and
- checking, based on a transmission source address and a reception port of a received frame and the state information, whether it is necessary to register a new entry in the database and, when it is necessary to register a new entry in the database, creating an entry in which the transmission source address and the current failure state information are search keys and the reception port is output information and registering the entry in the database.

14. The address learning method according to claim 13, wherein, in the checking whether it is necessary to register a new entry, when an entry including state information different from latest state information is registered in the database, the created entry is registered to overwrite the existing entry.

15. The address learning method according to claim 13, further comprising checking whether an entry in which the transmission source address of the received frame and the state information are search keys is registered in the database and, when the entry is registered in the database, further checking whether output information of the entry indicates the reception port of the received frame and, if the entry does not indicate the reception port, changing the entry such that the output information indicates the reception port of the received frame.

16. An address learning method that a communication apparatus, which operates as a node of a network, executes in updating a database comprising an entry indicating a correspondence relationship between a destination address of a received frame, state information indicating a state of the network and an output port of the received frame, the address learning method comprising:
   updating, every time failure occurrence in the network is detected, the state information managed separately from the database and storing, as a disabled port, a port in which the failure occurs or a port in which a frame for notifying the failure occurrence is received;
   searching through the database using the destination address of the received frame as a search key and determining, based on the state information and the output port as an obtained search result and the disabled port stored by the state managing unit, an output port of the received frame; and
   checking, based on a transmission source address and a reception port of a received frame and the state information, whether it is necessary to register a new entry in the database and, when it is necessary to register a new entry in the database, creating an entry in which the transmission source address is a search key and the state information and the reception port are output information and registering the entry in the database.

17. The address learning method according to claim 16, further comprising changing, when an entry in which the transmission source address of the received frame is a search key is registered in the database but output information of the entry indicates a port different from the reception port of the received frame or the output information includes the state information different from latest state information managed separately from the database, the entry such that the output information of the entry indicates the reception port and includes state information same as the latest state information.

18. The address learning method according to claim 16, further comprising executing database search for determining an output port and, when detecting, as a result of the database search, that an entry corresponding to a destination address of the received frame is registered in the database but the state information included in the output information is different from latest state information managed separately from the database and an output port indicated by the output information corresponds to the disabled port, disabling the entry.

19. The address learning method according to claim 16, further comprising executing database search for determining an output port and, when detecting, as a result of the database search, that an entry corresponding to a destination address of the received frame is registered in the database but state information included in the output information is different from latest state information managed separately from the database and an output port indicated by the output information is different from the disabled port, changing the entry such that the output information of the entry includes the latest state information.

* * * * *